Figure 1:
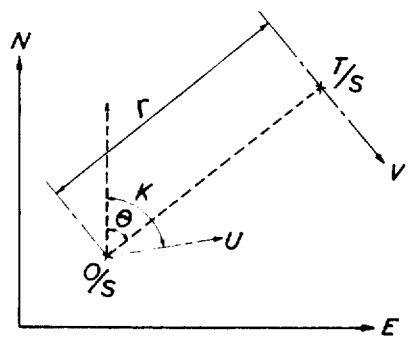

Feb. 14, 1967   C. SNOWDON ETAL   3,304,409
APPARATUS FOR COMPUTING THE RANGE COURSE AND/OR SPEED
OF A TARGET OR OTHER BODY
Filed March 15, 1961   5 Sheets-Sheet 1

United States Patent Office 3,304,409
Patented Feb. 14, 1967

3,304,409
APPARATUS FOR COMPUTING THE RANGE COURSE AND/OR SPEED OF A TARGET OR OTHER BODY
Charles Snowdon, Belfast, Northern Ireland, and Richard A. B. Bond, Plumstead, Republic of South Africa, assignors to Short Brothers & Harland Limited, Belfast, Northern Ireland, a British company
Filed Mar. 15, 1961, Ser. No. 125,285
Claims priority, application Great Britain, Mar. 23, 1960, 10,376/60
3 Claims. (Cl. 235—61.5)

The present invention relates to apparatus for computing the range, course and/or speed of a target or other body from measurements of the bearing of the target taken from a moving observation station.

For submarine warfare, it is desirable to provide on the submarine a means of measuring the range, course and speed of a target without disclosing the presence of the submarine. To achieve this it is necessary to employ passive listening equipment which is only capable of giving information on the bearing of the target. Hitherto, such equipment has been used and the range course and speed obtained by plotting the target positions on a plotting board. Apart from taking considerable time for the first target positions to be computed, the continued computation is slow and laborious and does not make the best use of the information available.

It is one object of the present invention to provide computing apparatus for computing the range of a target from measurements of the bearing $\theta$ of the target from an observing ship such as a submarine and measurements of the motion of the observing ship.

According to a first aspect of the present invention, there is provided apparatus for computing the range $r$ of a target or other body from a moving observing station, said apparatus comprising means for generating a first signal representative of the component $f_n$ of the acceleration $f$ of the target relative to the observing station, the component $f_n$ being an acceleration component at right angles to the target bearing line, means for generating a second signal representative of the second time derivative $\ddot{\theta}$ of the target bearing $\theta$, and means for applying said signals to a divider adapted to divide the first signal by the second signal to produce an output signal, the arrangement being such that the output signal is applied to an output terminal only when the first time derivative $\dot{\theta}$ of the bearing $\theta$ is zero or in a predetermined range close to zero.

According to a second aspect of the present invention, there is provided computing apparatus for computing the range $r$ of a target from a moving observing station, said apparatus comprising means for generating signals respectively representative of the first, second and third time derivatives $\dot{\theta}$, $\ddot{\theta}$ and $\dddot{\theta}$ of the target bearing $\theta$, means for generating a signal representative of a component $f_r$ of the acceleration $f$ of the target relative to the observing station, the component $f_r$ being an acceleration component along the target bearing line, and for generating a signal representative of a component $f_n$ of the acceleration $f$, the component $f_n$ being an acceleration component at right angles to said target bearing line, means for generating a signal representative of the first time derivative $\dot{f}_n$ of the acceleration component $f_n$, and means for operating on and combining said signals in accordance with the expression $$\frac{2\dot{\theta}\dot{f}_n - 3\ddot{\theta}f_n - 4\dot{\theta}^2 f_r}{4\dot{\theta}^4 + 2\dot{\theta}\dddot{\theta} - 3\ddot{\theta}^2}$$

or its equivalent to produce an output signal representative of the range $r$.

In a preferred embodiment according to the second aspect of the invention there is provided, in addition, further means for generating a further output signal representative of the range $r$ by continuously integrating a signal representative of the first time derivative $\dot{r}$ of the range $r$ obtained by operating on and combining the signals representative of $\dot{\theta}$, $\ddot{\theta}$, $f_n$ and the further output signal in accordance with the expression $$\frac{f_n}{2\ddot{\theta}} - \frac{r\dot{\theta}}{2\ddot{\theta}}$$

or its equivalent, a comparator for comparing said further signal with the first output signal to produce a difference signal representative of the difference in range values, means for applying said difference signal to adjust the further output signal to the same range value as the first output signal, a store whereby said difference signal is stored so as to be continuously applied in the absence of said first output signal, and switch means for preventing the application of the difference signal to said store when the acceleration $f$ falls below a predetermined value.

Figure 2:
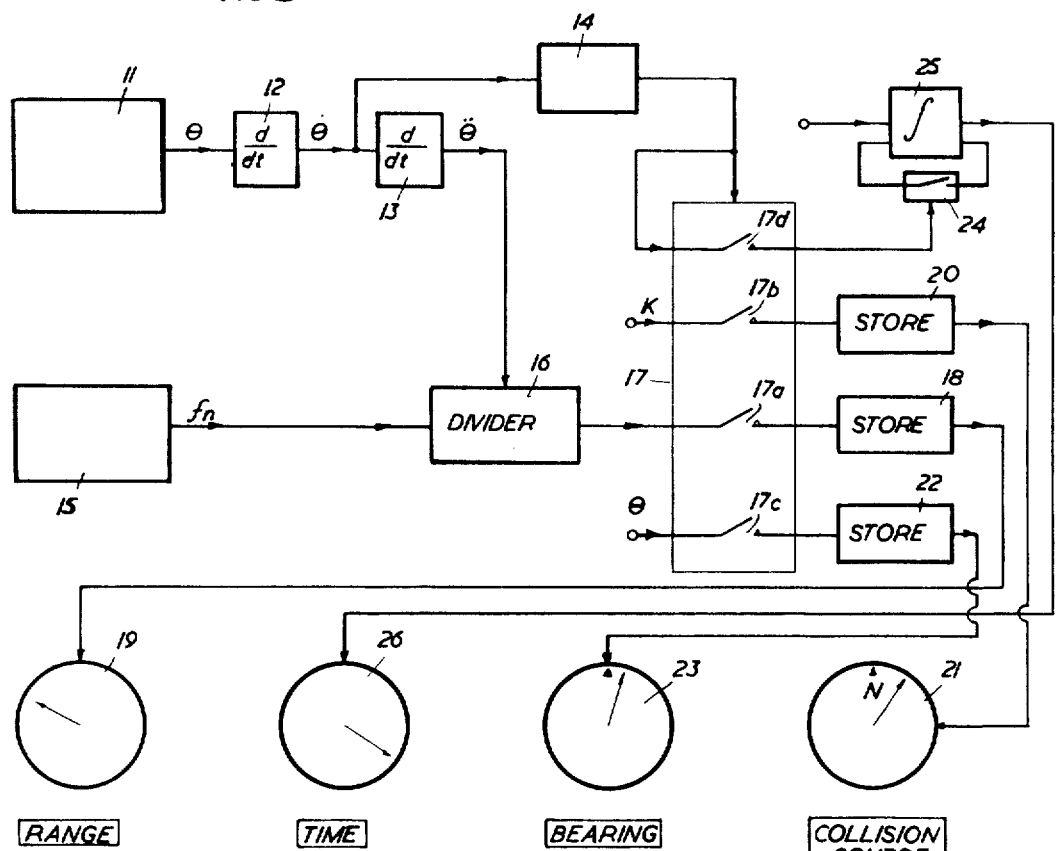
Figure 3:
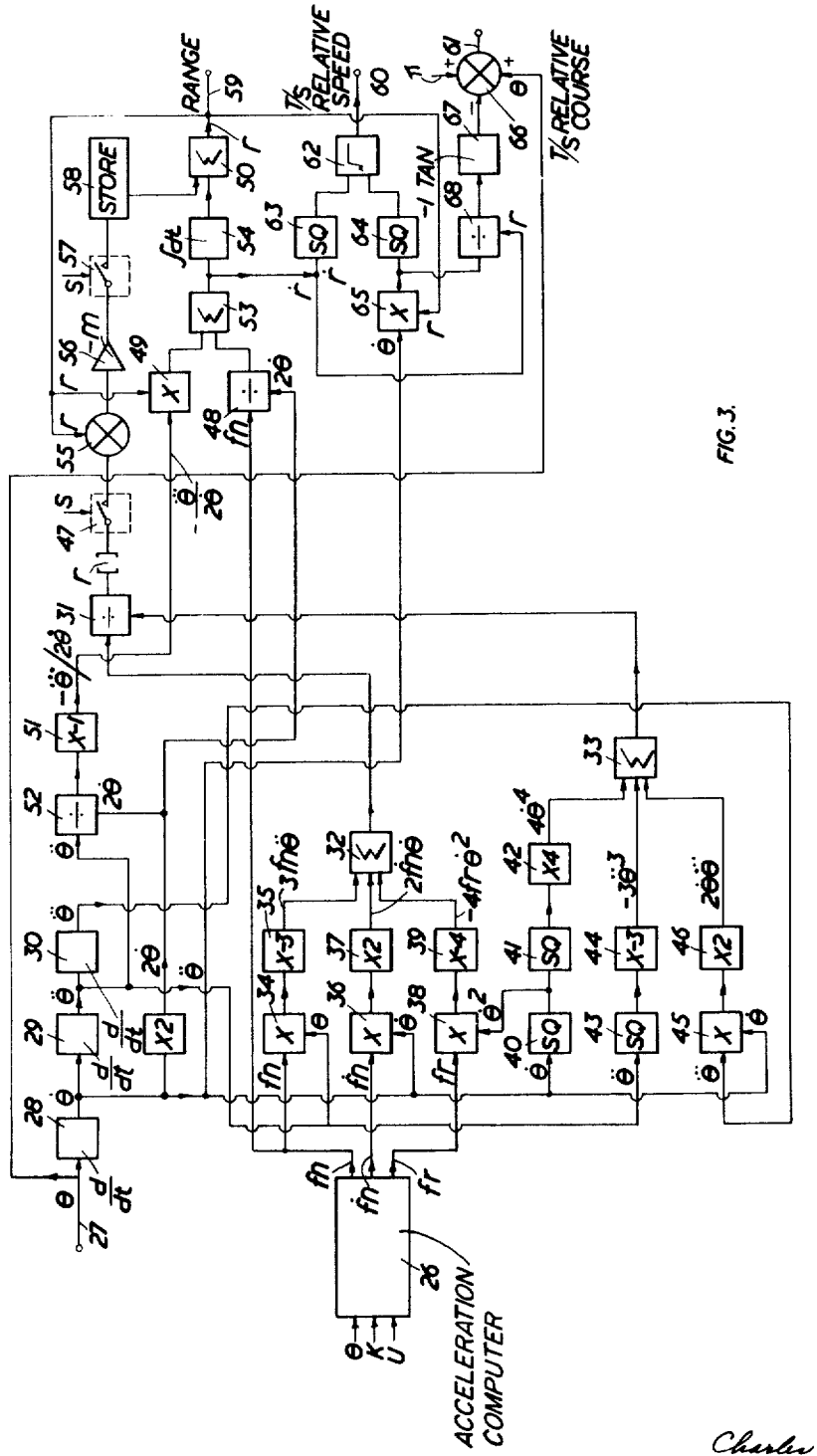
Figure 4:
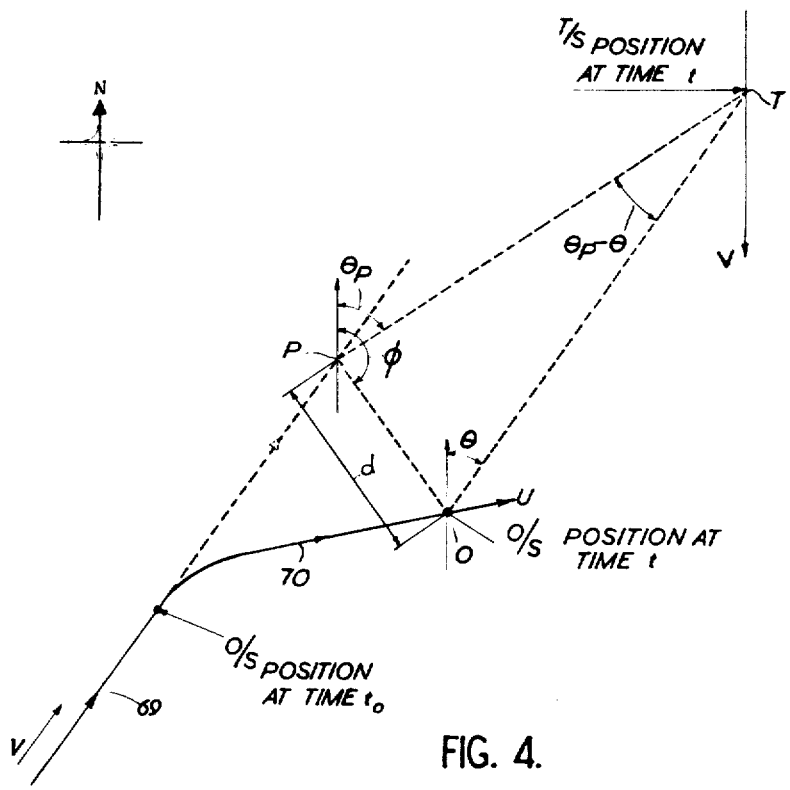
Figure 5:
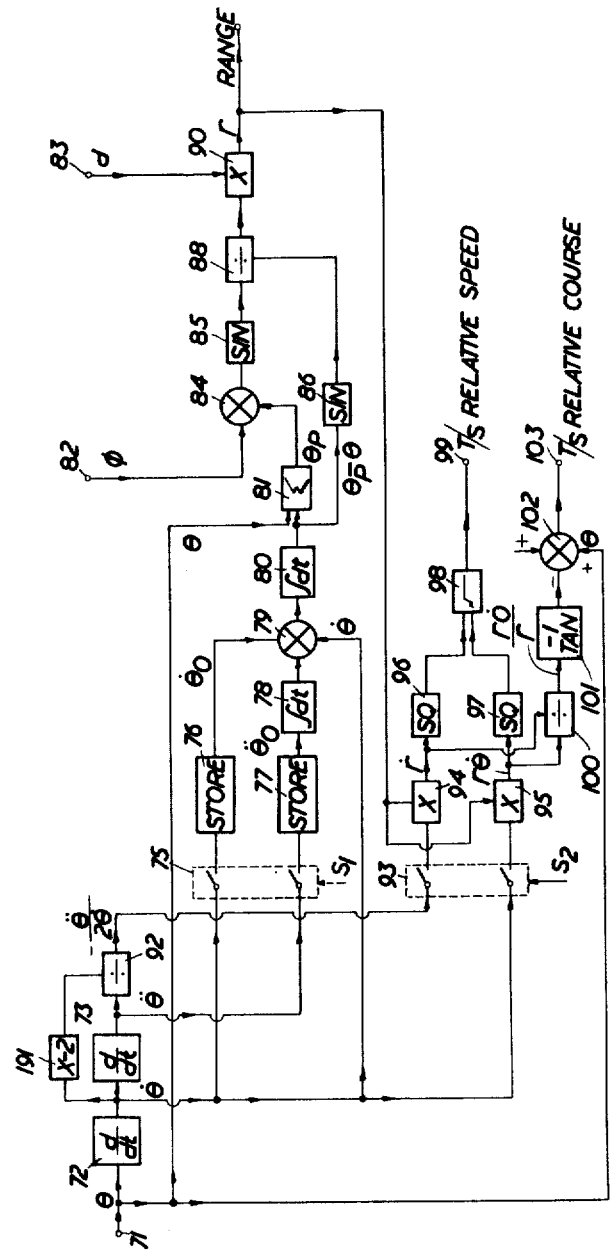
Figure 6:
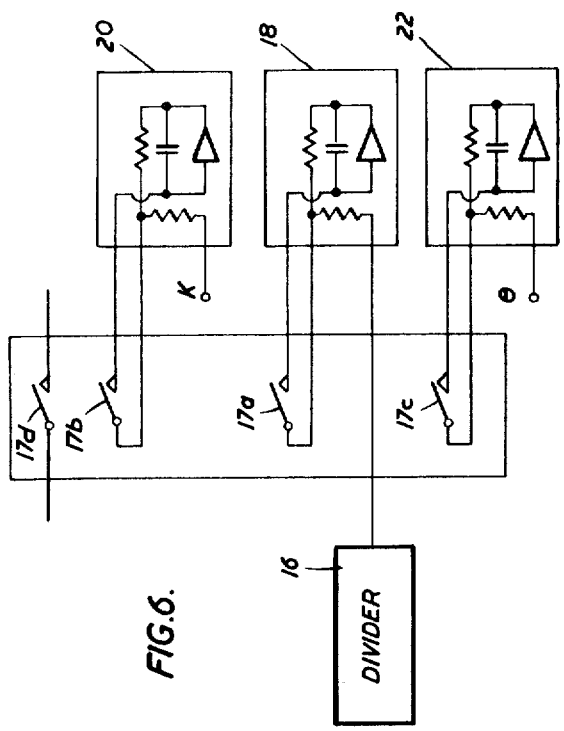
Figure 7:
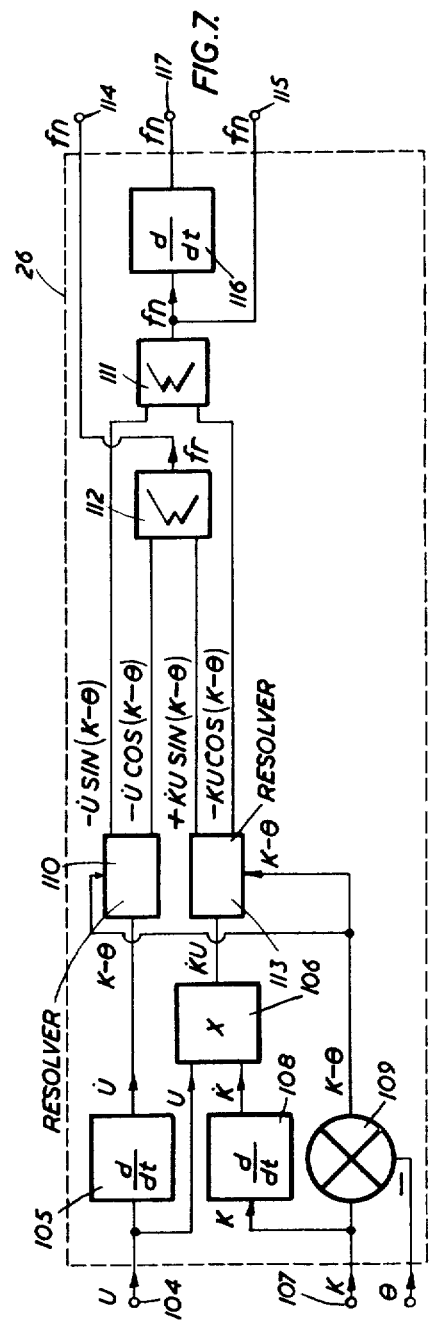

Some embodiments of the invention will now be described by way of example with reference to the accompanying drawings in which:

FIG. 1 is a diagram showing the positions of an observing ship O/S and a target ship T/S in a fixed frame of reference, FIG. 2 is a block schematic diagram of computing apparatus according to the first aspect of the invention, FIG. 3 is a block schematic diagram of computing apparatus according to the second aspect of the invention, FIG. 4 is a diagram showing the positions of the observing ship O/S and a target ship T/S in a fixed frame of reference and the manoeuvres of the observing ship O/S necessary to enable the range of the target ship to be calculated by apparatus according to a third aspect of the invention, FIG. 5 is a block schematic diagram of computing apparatus according to the third aspect of the invention, FIG. 6 is a circuit diagram showing details of the stores employed in the apparatus shown in FIG. 2, and FIG. 7 is a block schematic diagram showing details of one of the units employed in the apparatus shown in FIG. 3.

Referring first to FIG. 1, the observing ship O/S is moving in the fixed frame of reference at a velocity U on a heading K. The target ship T/S is moving with a velocity V at a range $r$ from the observing ship. The bearing of the target ship measured from the observing ship is indicated by the angle $\theta$.

Referring now to FIG. 2 a passive listening unit 11, which may be of known form such as ASDIC, is adapted to generate an output signal the magnitude of which is a measure of the bearing angle $\theta$. This output signal is applied to a differentiating unit 12 which generates an output signal representing the first time derivative $\dot{\theta}$ of the angle $\theta$. The signal from the unit 12 is applied to a further differentiating unit 13 generating an output signal representing the second time derivative $\ddot{\theta}$ of the angle $\theta$ and to a filter 14 adapted to generate an output signal only when the signal applied thereto is zero or within a range of values close to zero.

There is further provided an acceleration-measuring unit 15 which may be of conventional form and which is adapted to generate an output signal the magnitude of which is a measure of the component $f_n$ of the acceleration $f$ of the target ship T/S relative to the observing ship O/S, the component $f_n$ being the acceleration component at right angles to the target bearing line. The output signal from the unit 15 is applied to a divider 16 to which is also applied the signal from the unit 13. The divider 16 is adapted to produce an output signal which is a measure of the quotient $f_n/\theta$, and this signal is applied to a normally-open pair of contacts 17a of a switch 17.

The switch 17 is controlled by the output signal from the filter 14 and is arranged to be closed by the application of this signal. It will thus be apparent that the switch 17 closes only when $\theta$ is zero or substantially zero and that the signal representing the function $f_n/\theta$ is transmitted by the switch only under these conditions. It can be shown mathematically that when $\theta$ is zero the function $f_n/\theta$ is a measure of the range $r$ of the target. The signal transmitted by the contacts 17a is therefore a measure of the range $r$. It will however be apparent that the switch 17 is only closed for a short period at times when $\theta$ passes through zero. The transmitted signal is therefore applied to a store 18 which is adapted to store the signal until a further signal is transmitted thereto. The stored signals are continuously applied to a range indicator 19 which provides a visual indication of the range $r$.

The switch 17 includes a further pair of normally-open contacts 17b to which is applied a signal representing the observing ship's heading K obtained from conventional equipment (not shown). This signal is transmitted by the contacts 17b upon closure of the switch 17 and the transmitted signal is fed to a store 20, where it is stored until a further signal is transmitted. The heading K of the observing ship when $\theta$ is zero is a collision heading and the signal generated by the store 20 represents the collision heading. The latter signal is applied to a collision-course indicator 21 which gives a visual indication of the collision course.

The switch 17 includes a third pair of normally-open contacts 17c to which is applied a signal representing the bearing $\theta$ obtained from the equipment 11. This signal is transmitted by the contacts 17c when the switch 17 closes and the transmitter signal is applied to a store 22, where it is stored until a further signal is transmitted. The output signal from the store 22 is applied to a bearing indicator 23 which gives a visual indication of the collision bearing $\theta$.

The output signal from the filter 14 is applied to a pair of normally-open contacts 17d of the switch 17 and is transmitted through said contacts when the switch closes. The transmitted signal is applied to close a short circuiting switch 24 of an integrator 25, to which is applied constant input voltage. The integrator 25 serves as a clock which starts from zero when the switch 17 opens and is returned to zero upon the reclosing of the switch 17. The output signal from the integrator 25 is applied to a time indicator 26 which gives a visual indication of the time which has elapsed since the last signal transmitted by the switch 17.

The acceleration-measuring unit 15 as hereinbefore described is adapted to generate a signal representative of the component $f_n$ of the acceleration $f$ of the target ship T/S relative to the observing ship. If it is assumed that the target ship T/S is on steady constant-speed course then $f_n = a_n$ where $a_n$ is the acceleration component, measured in the same sense as $f_n$, of the acceleration $a$ of the observing ship in the earth's fixed frame of reference. Where the observing ship O/S is a submarine and its presence not known to the target ship T/S it is highly probable that the target ship will follow a constant speed steady course. In such circumstances, therefore, the acceleration-measuring unit may simply comprise an accelerometer arranged to measure $a_n$ directly and produce an output signal representative of $a_n$.

Alternatively, the component $f_n$ can be obtained from measurements of the velocity U of the observing ship, its heading K and the target bearing $\theta$, since it can be shown that $$f_n = -\dot{U}\sin(K-\theta) - \dot{K}U\cos(K-\theta)$$

where $\dot{U}$ and $\dot{K}$ are the time derivatives of the velocity U and the heading K. Thus, the acceleration-measuring unit 15 may comprise means for operating on and combining the signals representative of $\theta$, K and U according to the above expression.

Referring now to FIG. 3, this shows schematically computing apparatus according to the second aspect of the invention for measuring the range, speed and course of a target ship T/S relative to an observing ship O/S. It will be recalled that a signal representative of the range $r$ of a target relative to an observing station is derived from signals representative of $f_n$, $\dot{f}_n$, $f_r$ and $\theta$, $\dot{\theta}$ and $\ddot{\theta}$ by operating on them and combining them according to the expression $$\frac{2\dot{\theta}\dot{f}_n - 3\ddot{\theta}f_n - 4\dot{\theta}^2 f_r}{4\dot{\theta}^4 + 2\dot{\theta}\dddot{\theta} - 3\ddot{\theta}^2} \quad (1)$$

and the apparatus shown in FIG. 3 serves to carry out these mathematical operations.

As hereinbefore stated the acceleration component $f_n$ can readily be obtained from measurements of $\theta$, K and U. The component $f_r$ can likewise readily be obtained from measurements of $\theta$, K and U, the expression for $f_r$ being $$f_r = -\dot{U}\cos(K-\theta) + \dot{K}U\sin(K-\theta)$$

In FIG. 3, there is shown an acceleration computing unit 26 to which are applied signals representative of $\theta$, K and U which are derived from dead-reckoning equipment of conventional form generally found on present day warships. The unit 26 serves to operate on and combine the applied signals according to the above expressions for $f_r$ and $f_n$ and to generate output signals representative of the acceleration components $f_r$, $f_n$ and the first time derivative $\dot{f}_n$ of the component $f_n$.

The signal representative of $\theta$ is applied to an input terminal 27, from which it is fed through first, second and third differentiating units 28, 29 and 30, which generate output signals representative of $\dot{\theta}$, $\ddot{\theta}$ and $\dddot{\theta}$. These signals together with the output signals from the unit 26 are operated upon and combined to produce at the output of a divider 31 a signal representative of the range $r$.

The divider 31 is fed with two signals one of which represents the numerator of the above expression for range and is produced by a summing unit 32 and the other of which represents the denominator of the expression and is produced by a summing unit 33. As will be seen, the summing unit 32 is fed with three signals representative of the three parts of the numerator to be added together, the signal representative of the first part being produced by the multiplier units 34 and 35, the signal representative of the second part being produced by the multiplier units 36 and 37, and the signal representative of the third part being produced by the multiplier units 38 and 39. The summing unit 33 is fed with signals representative of the three parts of the denominator to be added together, the signal representative of the first part being produced by the two squaring units 40 and 41 and the multiplier unit 42, the signal representative of the second part being produced by the squaring unit 43 and the multiplier unit 42, the signal representative of the third part being produced by the multiplier units 45 and 46. It will be seen that all these units are fed with signals produced by the acceleration measuring unit 26 and the differentiating units 28, 29 and 30. The units 35, 37, 39, 42, 44 and 46 are constant coefficient multipliers.

It will be apparent that the accuracy with which the range $r$ can be computed using the apparatus above described depends on the accuracy with which the measurements of $\theta$, K and U can be made and the variables $f_r$, $f_n$, $\dot{f}_n$, $\dot{\theta}$, $\ddot{\theta}$ and $\dddot{\theta}$ derived. The sizes of the numerator and denominator of the expression for the range $r$ will depend on the course steered as also will the relative magnitudes of their individual terms. The numerator and denominator should both be as large as possible when range is being calculated. Thus, it is desirable to make $f_n$ as large as possible.

Upon the assumption that the target ship T/S is not undergoing acceleration, the required values of the acceleration $f$ and its components $f_n$ and $f_r$ must be obtained by acceleration of the observing ship O/S. This is best achieved by applying a steady turn and maintaining a constant speed U, as this does not require any excessive departure from the desired heading of the observing ship O/S, and the values of $f_n$ thus obtained are much greater than could conveniently be achieved by varying the speed U.

In order to ensure that the range signal from the divider 31 is utilised only when it accurately represents the range, a switch 47 is provided which prevents the transmission of the signal when the acceleration $f$ is zero or small. Furthermore, in order to provide a continuous indication of the range $r$ there is provided additional computing apparatus now to be described.

It can be shown that the first time derivative $\dot{r}$ of the range $r$ can be expressed in terms of $r$, $\theta$, $\dot{\theta}$ and $f_n$ as follows: The normal acceleration for a particle moving in a plane with $r$ and $\theta$ coordinates is given by (Dynamics by Horace Lamb p. 258):

$$f_n = \frac{1}{r}\frac{d}{dt}(r^2\dot{\theta})$$

Differentiating this equation results in $$f_n = r\ddot{\theta} + 2\dot{r}\dot{\theta}$$

rearranging and solving for $\dot{r}$:

$$\dot{r} = \frac{f_n}{2\dot{\theta}} - \frac{r\ddot{\theta}}{2\dot{\theta}} \qquad (2)$$

The apparatus now to be described serves to operate on and combine signals representative of $r$, $\dot{\theta}$ and $\ddot{\theta}$ and $f_n$ to produce a signal representative of $\dot{r}$ and to integrate this signal to produce an output signal representative of $r$. It will be apparent that the apparatus forms a closed loop in which the range signal is fed back to assist in its derivation.

A signal representative of the term $f_n/2\dot{\theta}$ is obtained from a divider unit 48 and a signal representative of the term $-r\ddot{\theta}/2\dot{\theta}$ is obtained from a multiplier unit 49 fed with the range signal from the output of a summing unit 50 and a signal representative of $-\ddot{\theta}/2\dot{\theta}$ obtained from a multiplier unit 51 and a divider unit 52. The signals from the units 48 and 49 are added together in a summing unit 53 which produces an output signal representative of $\dot{r}$. The latter signal is integrated by an integrator unit 54 to produce a range signal which is applied to the summing unit 50.

The range signal from the summing unit 50 is applied to a subtracting unit 55 to which is also applied the range signal intermittently transmitted by the swtich 47. The output signal from the unit 55 is representative of the difference between the range as represented by the signal transmitted by the switch 47 and the range as represented by the signal from the unit 50. This difference signal is multiplied by a factor $-m$ in a unit 56 and applied to the normally-open contacts of a switch 57 which is arranged to close only when the switch 47 closes. The signal transmitted by the switch 57 is applied to a store 58 where it is stored until a further signal is applied thereto. The output signal from the store 58 is a continuous signal representating the range difference and is applied to the summing unit 50 where it is arranged to modify the signal applied thereto so that the range signal appearing at the output thereof and applied to a terminal 59 is based on that which was last transmitted by the switch 47.

The course B and the speed W of the target ship T/S relative to the observing ship O/S can be expressed in terms of $\theta$, $\dot{\theta}$, $r$ and $\dot{r}$ as follows:

$$W = (\dot{r}^2 + r^2\dot{\theta}^2)^{1/2}$$

$$B = \pi + \theta - \tan^{-1}\frac{r\dot{\theta}}{\dot{r}}$$

Apparatus for computing W and B is included in the arrangement shown in FIG. 3 and signals representative of W and B appear at output terminals 60 and 61 respectively. The signal representative of W is obtained from an adding and square-rooting unit 62 which serves to add the signals applied thereto and to operate on the sum to produce the square root thereof. The input signals to the unit 62 are obtained from squaring units 63 and 64, the first of which is fed with a signal from the unit 53 and the second of which is fed with a signal from a multiplier unit 65 in turn fed with signals representative of $\dot{\theta}$ and $r$.

The signals representative of B is obtained from a summing unit 66 which is fed with a signal representative of $\theta$, a constant amplitude signal representative of $\pi$ and a signal from a unit 67 adapted to produce a signal representative of the angle whose tangent is represented by the input signal applied thereto. The unit 67 is fed with a signal from a divider unit 68 to which signals from units 53 and 65 are applied.

According to a third aspect of the present invention, there is provided computing apparatus for computing the range $r$ of a target from a moving observing station, said apparatus comprising means for generating signals respectively representative of the bearing $\phi$ at a time $t$ of the observing station taken from a predicted position of the observing station to which the observing station would have moved at time $t$ had it continued on a first course and not been redirected on to a second course, the bearing $\theta_p$ of the target from the predicted position, the bearing $\theta$ of the target from the observing station at time $t$ and the distance $d$ of the predicted position at time $t$ from the station position at time $t$, and means for operating on and combining said signals according to the expression $$\frac{\sin(\phi - \theta_p)}{\sin(\theta_p - \theta)}d$$

to generate an output signal representative of said expression and thereby representative of the range $r$.

In a preferred embodiment according to the third aspect of the present invention the means for generating the signal representative of $\theta_p$ comprise means for generating at a time $t_0$ a signal representative of the bearing $\theta_0$ of the target from the observing station when the latter is on the first course and for generating signals representative of first and second time derivatives $\dot{\theta}_0$ and $\ddot{\theta}_0$ at time $t_0$ and means for operating on and combining said signals according to the expression $$\theta_0 + (t-t_0)\dot{\theta}_0 + \tfrac{1}{2}(t-t_0)^2\ddot{\theta}$$

to produce a signal representative of said expression and thereby of $\theta_p$.

Referring now to FIG. 4, the straight line 69 represents a first course traversed by an observing ship O/S at constant speed U and the line 70 a second course to which the observing ship O/S is redirected at a time $t_0$ and along which it travels at constant speed U. The broken-line extension of the line 69 is the course which the observing ship would have followed had it not been redirected at time $t_0$ and the point P is a predicted position of the observing ship O/S at a time $t$ had it followed the first course. The position of the target ship T/S is indicated at T and the position of the observing ship O/S at time $t$ is indicated at O. The speed of the target ship T/S is V and its direction of travel as indicated by the full line leading from the point T.

For the purpose of calculating the range $r$ by means of apparatus now to be described with reference to FIG. 5 it is necessary for the observing ship O/S to undergo a change of course as indicated in FIG. 4 and for the apparatus to be set to operate at a time $t_0$ just before the change of course is made.

Referring now to FIG. 5, a signal representative of $\theta$ and derived from conventional bearing measurement equipment (not shown) is applied to an input terminal 71 from which it is fed to first and second differentiating units 72 and 73 producing output signals representative of $\dot{\theta}$ and $\ddot{\theta}$. These signals together with the signal representative of $\theta$ are employed in apparatus now to be described which serves to generate a signal representative of $\theta_p$. As hereinbefore stated $\theta_p$ at time $t$ can be expressed as follows:

$$\theta_p = \theta_0 + (t-t_0)\dot{\theta}_0 + \frac{1}{2}(t-t_0)^2\ddot{\theta}$$

where $\theta_0$, $\dot{\theta}_0$ and $\ddot{\theta}_0$ are the bearing angle and the first and second derivatives thereof at time $t_0$.

The signals from the units 72 and 73 are applied to normally-open contacts of a switch 75 which is controlled from a remote control panel (not shown) and is closed momentarily at time $t_0$ just before the course of the observing ship O/S is changed. The signals transmitted by the switch 75 are stored in stores 76 and 77 which provide continuous output signals representative of $\dot{\theta}_0$ and $\ddot{\theta}_0$. The signal from the store 77 is fed to an integrator unit 78 which serves to generate an output signal representative of $(t-t_0)\ddot{\theta}_0$. The latter signal is applied to a unit 79 to which is also applied the signal from the store 76 and a signal representative of $\ddot{\theta}$ from the unit 72. The unit 79 produces a signal representative of $\dot{\theta}_0 + (t-t_0)\ddot{\theta} - \dot{\theta}$ which is integrated with respect to time in an integrator unit 80 which produces a signal representative of $\theta_p - \theta$. This signal is applied to a summing unit 81 where it is added to a signal representative of $\theta$ to produce at an output signal representative of $\theta_p$.

The part of the apparatus now to be described serves to generate a range signal by operating on and combining signals representative of the variables $\theta_p$, $\theta$, $\phi$ and $d$ hereinbefore defined. As previously indicated the range $r$ can be expressed as follows:

$$r = \frac{\sin(\phi - \theta_p)}{\sin(\theta_p - \theta)} d$$

Signals representative of the angle $\phi$ and the distance $d$ at a time $t$ are readily obtained from conventional equipment and these signals are applied to input terminals 82 and 83 respectively. The signal applied to the terminal 82 is fed to a unit 84 to which is also fed the signal from unit 81. The output signal from the unit 84 represents the difference function $\phi - \theta_p$ and is applied to a resolver 85 which produces a signal representative of $\sin(\phi - \theta_p)$. The signal from the integrator unit 80 is likewise applied to a resolver 86 which produces a signal representative of $\sin(\theta_p - \theta)$. The signals from the units 85 and 86 are applied to a divider 88 the output signal of which is fed to a multiplier unit 90, to which is also applied the signal from terminal 83. A signal representative of the range $r$ is generated by the divider 90 and applied to an output terminal 91.

Further apparatus is provided for producing signals representative of the relative speed W and course B of the target ship T/S relative to the observing ship O/S. As hereinbefore specified the relative speed W and the course B can be expressed as follows:

$$W = (\dot{r}^2 + r^2\dot{\theta}^2)^{1/2}$$

$$B = \pi + \theta - \tan^{-1}\frac{r\dot{\theta}}{\dot{r}}$$

Furthermore, when the acceleration $f$ of the target ship T/S relative to the observing ship O/S is zero $$\dot{r} = -\frac{r\ddot{\theta}}{2\dot{\theta}}$$

The apparatus now to be described serves to carry out on the signals representative of $\theta$, $\dot{\theta}$ and $\ddot{\theta}$ the operations set out in these expressions. The signal from the unit 72 is applied to a multiplier unit 191 which produces a signal representative of $-2\dot{\theta}$. This signal is applied to a divider 92 which serves to generate a signal representative of $-\ddot{\theta}/2\dot{\theta}$. The signals from the divider 92 and the differentiating unit 72 are applied to the normally-open contacts of a switch 93 which is arranged to close only if the acceleration $f$ is zero. Signals transmitted by the switch 93 are fed to multiplier units 94 and 95 to each of which is also applied the range signal from terminal 91. The output signals from the units 94 and 95 are applied to squaring units 96 and 97 the outputs of which are applied to an adding and square-rooting unit 98 which generates an output signal representative of W for application to an output terminal 99. The signals from units 94 and 95 are also applied to a divider 100 which produces a signal representative of the term $r\dot{\theta}/\dot{r}$. This signal is applied to a unit 101 which generates therefrom a signal representative of the angle whose tangent is $r\dot{\theta}/\dot{r}$. The latter signal is applied to a summing unit 102, to which are also applied signals representative of $\theta$ and $\pi$ to produce an output signal which is a measure of B and is applied to an output terminal 103.

The stores 18, 20 and 22 of the apparatus shown in FIG. 2 may be of any well known form. For example, a typical electronic store utilizing a conventional computing amplifier as shown in FIG. 6 may be employed. The stores shown in FIGS. 3 and 5 may also be of the form shown in FIG. 6.

The acceleration computing unit 26 of the apparatus shown in FIG. 2 will now be described in detail with reference to FIG. 7. Referring to the drawing a signal representative of U is applied to an input terminal 104 from which it is fed to a differentiating unit 105 and to a multiplier unit 106. A signal representative of the heading K of the observing ship is applied to an input terminal 107 from which it is fed to a differentiating unit 108 and to a subtracting unit 109, to which is also applied a signal representative of the bearing $\theta$ of the target.

The output of the differentiating unit 105 and the output of the subtracting unit 109, which is representative of $K-\theta$, are applied to a resolver 110 which generates two output signals one of which is representative of the expression $-\dot{U}\sin(K-\theta)$ and is applied to a summing unit 111 and the other of which is representative of the expression $-\dot{U}\cos(K-\theta)$ and is applied to a summing unit 112. The output of the multiplier unit 106 and the output of the subtracting unit 109 are applied to a resolver 113 which generates two signals, one of which is representative of the expression $+\dot{K}U\sin(K-\theta)$ and is applied to the summing unit 112 and the other of which is representative of the expression $-\dot{K}U\cos(K-\theta)$ and is applied to the summing unit 111.

The output of the summing unit 112 is a signal representative of the acceleration component $f_r$ and is applied to output terminal 114. The output of the summing unit 111 is a signal representative of the acceleration component $f_n$ and is applied to an output terminal 115 and also to a differentiating unit 116, the output of which is representative of $\dot{f}_n$ and is applied to an output terminal 117.

What we claim as our invention and desire to secure by Letters Patent is:

1. Apparatus for computing the range $r$ of a target from a moving observing station, said apparatus comprising means for generating signals respectively representative of the first, second and third time derivatives $\dot{\theta}$, $\ddot{\theta}$ and $\dddot{\theta}$ of the target bearing $\theta$, means for generating a signal representative of a component $f_r$ of the acceleration $f$ of the target relative to the observing station, the component $f_r$ being an acceleration component along the target bearing line, and for generating a signal representative of a component $f_n$ of the acceleration $f$, the component $f_n$ being an acceleration component at right angles to said target bearing line, means for generating a signal representative of the first time derivative $\dot{f}_n$ of the acceleration component $f_n$, and means for operating on and combining said signals in accordance with the expression $$\frac{2\dot\theta f_n - 3\theta f_n - 4\theta^2 f_r}{4\theta^4 + 2\theta\ddot\theta - 3\dot\theta^2}$$

or its equivalent to produce an output signal representative of the range $r$.

2. Apparatus according to claim 1, comprising further means for generating a further output signal representative of the range $r$ by continuously integrating a signal representative of the first time derivative $\dot r$ of the range $r$ obtained by operating on and combining the signals representative of $\theta$, $\dot\theta$ and $f_n$ and the further output signal in accordance with the expression $$\frac{f_n}{2\dot\theta} - \frac{r\ddot\theta}{2\dot\theta}$$

or its equivalent, a comparator for comparing said further output signal with the first output signal to produce a difference signal representative of the difference in range values, means for applying said difference signal to adjust the further output signal to the same range value as the first output signal at times when the acceleration $f$ is outside a range of values which includes zero.

3. Apparatus according to claim 2, further comprising a store in which said difference signal is stored so as to be continuously applied to adjust the further output signal in the absence of said first output signal, and switch means for preventing the application of the difference signal to said store when the acceleration $f$ falls below a predetermined magnitude.

References Cited by the Examiner

UNITED STATES PATENTS

| | | | |
|---|---|---|---|
| 2,660,371 | 11/1953 | Campbell et al. | 235—61.5 |
| 2,773,643 | 12/1956 | Teiling | 235—61.5 |
| 2,805,022 | 9/1957 | Shelley | 235—61.5 |
| 2,923,466 | 2/1960 | Crowther | 235—61.5 |
| 3,010,676 | 11/1961 | Shelley | 235—150 X |

FOREIGN PATENTS 1,020,906  12/1955  Germany.

MALCOLM A. MORRISON, *Primary Examiner.*

I. KESCHNER, D. W. COOK, *Assistant Examiners.*